(12) United States Patent
Nomura et al.

(10) Patent No.: US 6,419,000 B1
(45) Date of Patent: Jul. 16, 2002

(54) RAW BAR STRIPPING OFF AND CLEANING JIG AND RAW BAR STRIPPING OFF AND CLEANING METHOD

(75) Inventors: Michinao Nomura; Tsutomu Honma, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/488,512

(22) Filed: Jan. 20, 2000

(30) Foreign Application Priority Data

Jun. 18, 1999 (JP) .......................................... 11-172753

(51) Int. Cl.[7] .............................................. B32B 35/00
(52) U.S. Cl. ..................... 156/584; 156/344; 211/41.12
(58) Field of Search .................................. 156/344, 584; 269/296; 211/41.12, 41.17, 41.18

(56) References Cited

U.S. PATENT DOCUMENTS

| | | | | |
|---|---|---|---|---|
| 3,877,134 A | * | 4/1975 | Shanahan ................. 211/41 X |
| 3,998,333 A | * | 12/1976 | Kamada ....................... 211/41 |
| 4,511,194 A | * | 4/1985 | Park et al. ............. 211/41.12 X |
| 5,112,461 A | * | 5/1992 | Barnes .................... 156/344 X |
| 5,503,173 A | * | 4/1996 | Kudo et al. ............. 269/296 X |
| 5,538,230 A | * | 7/1996 | Sibley ........................ 269/296 |
| 5,591,364 A | * | 1/1997 | Suppelsa et al. ........ 156/344 X |
| 5,727,695 A | * | 3/1998 | English, II ............ 211/41.12 X |
| 5,934,463 A | * | 8/1999 | Yu ....................... 211/41.13 X |
| 6,249,955 B1 | * | 6/2001 | Freund et al. ......... 211/41.18 X |
| 6,264,036 B1 | * | 7/2001 | Mimken et al. ....... 211/41.18 X |

* cited by examiner

Primary Examiner—Mark A. Osele
(74) Attorney, Agent, or Firm—Greer, Burns & Crain, Ltd.

(57) ABSTRACT

A raw bar stripping off and cleaning jig has a stripping-off member on which transfer tools are placed, a base for supporting raw ban to be stripped off from the transfer tools, a stripping-off suction member for attracting the raw bars to separate the same from the transfer tools, and a cover member for supporting the raw bars in the base after stripping.

7 Claims, 17 Drawing Sheets

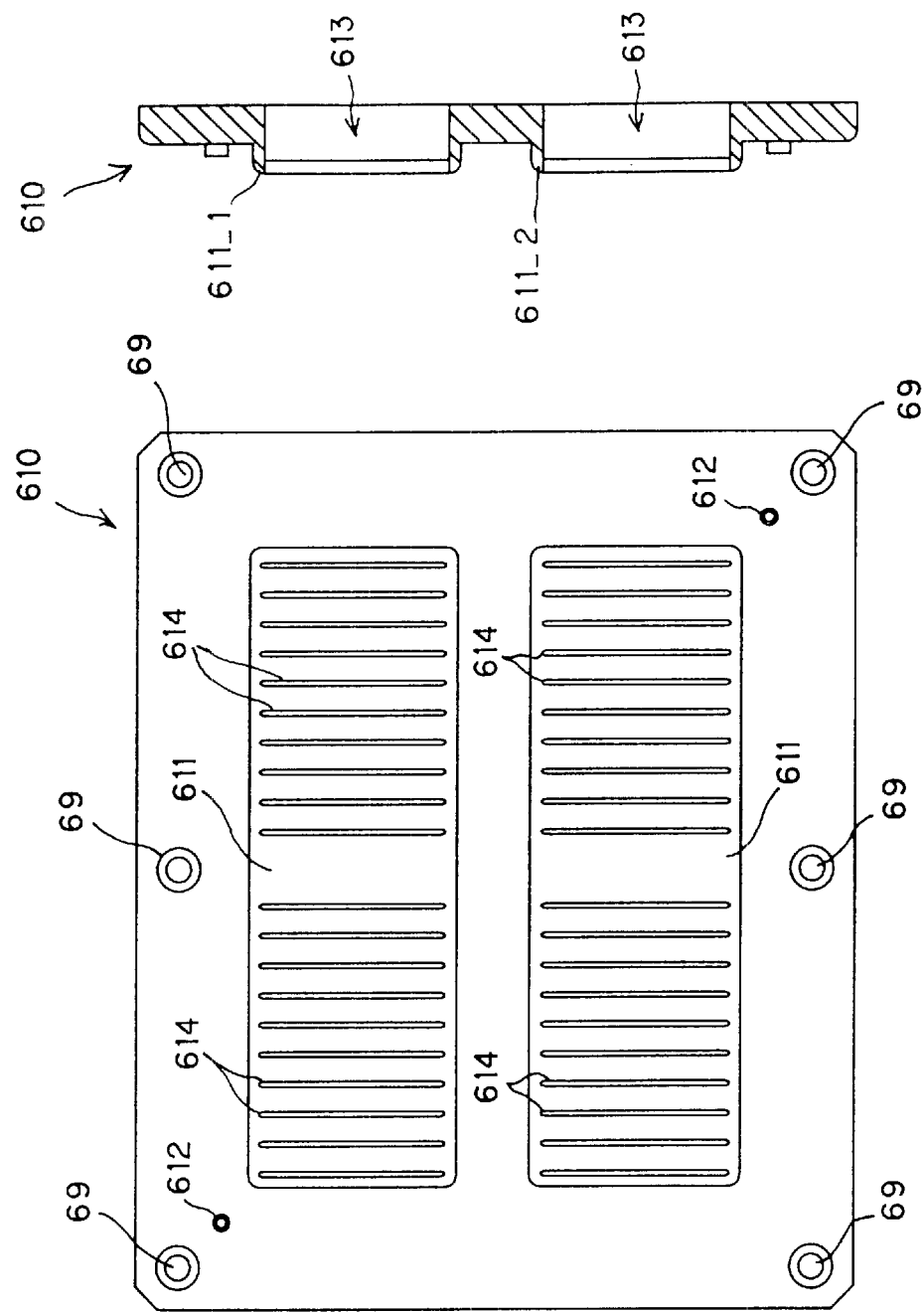

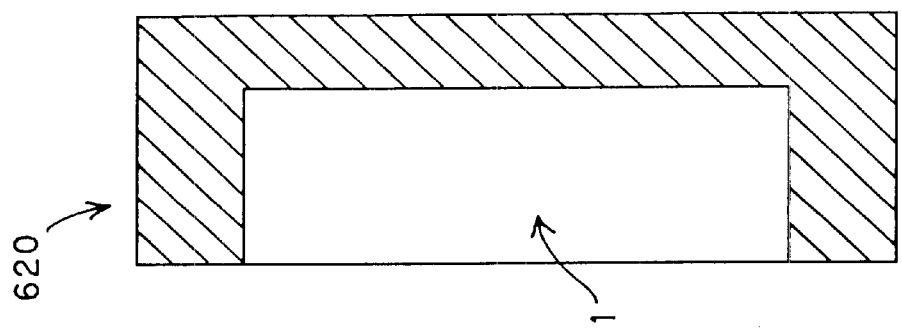
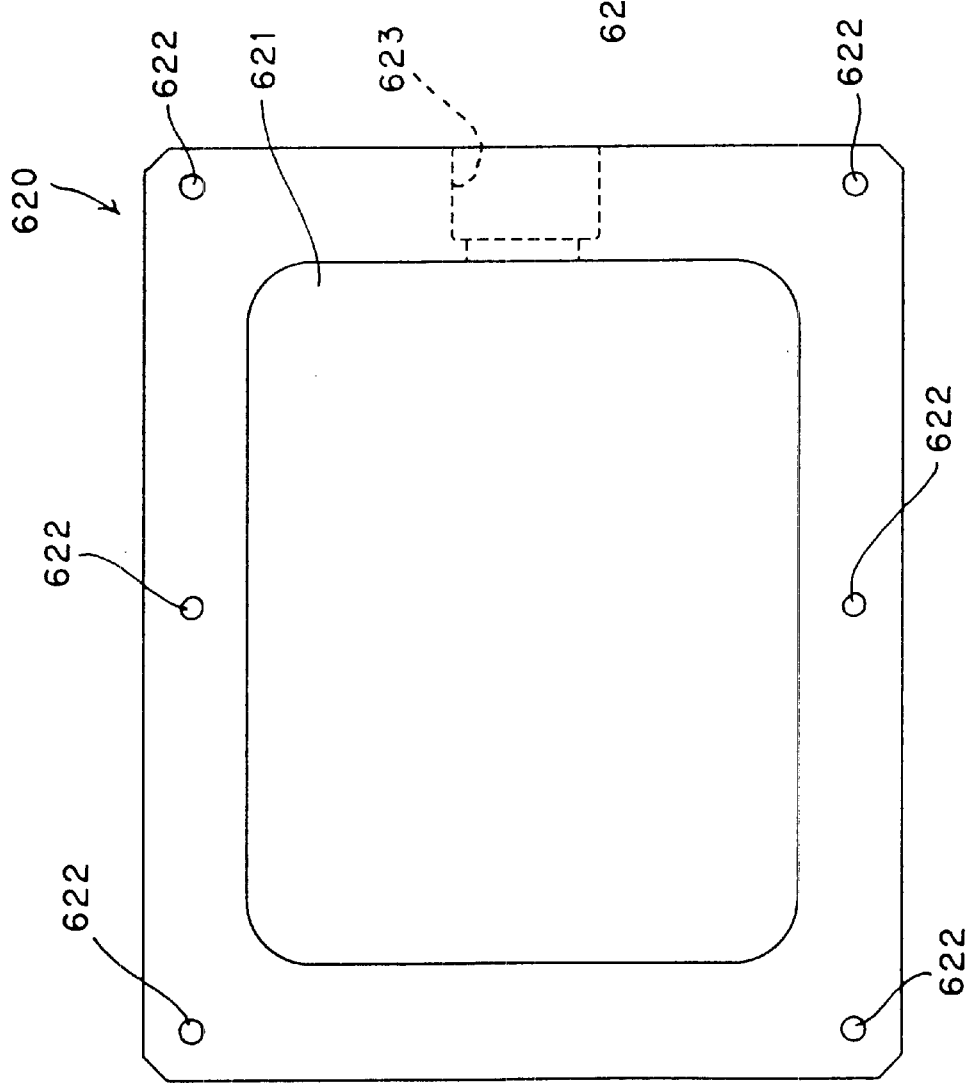

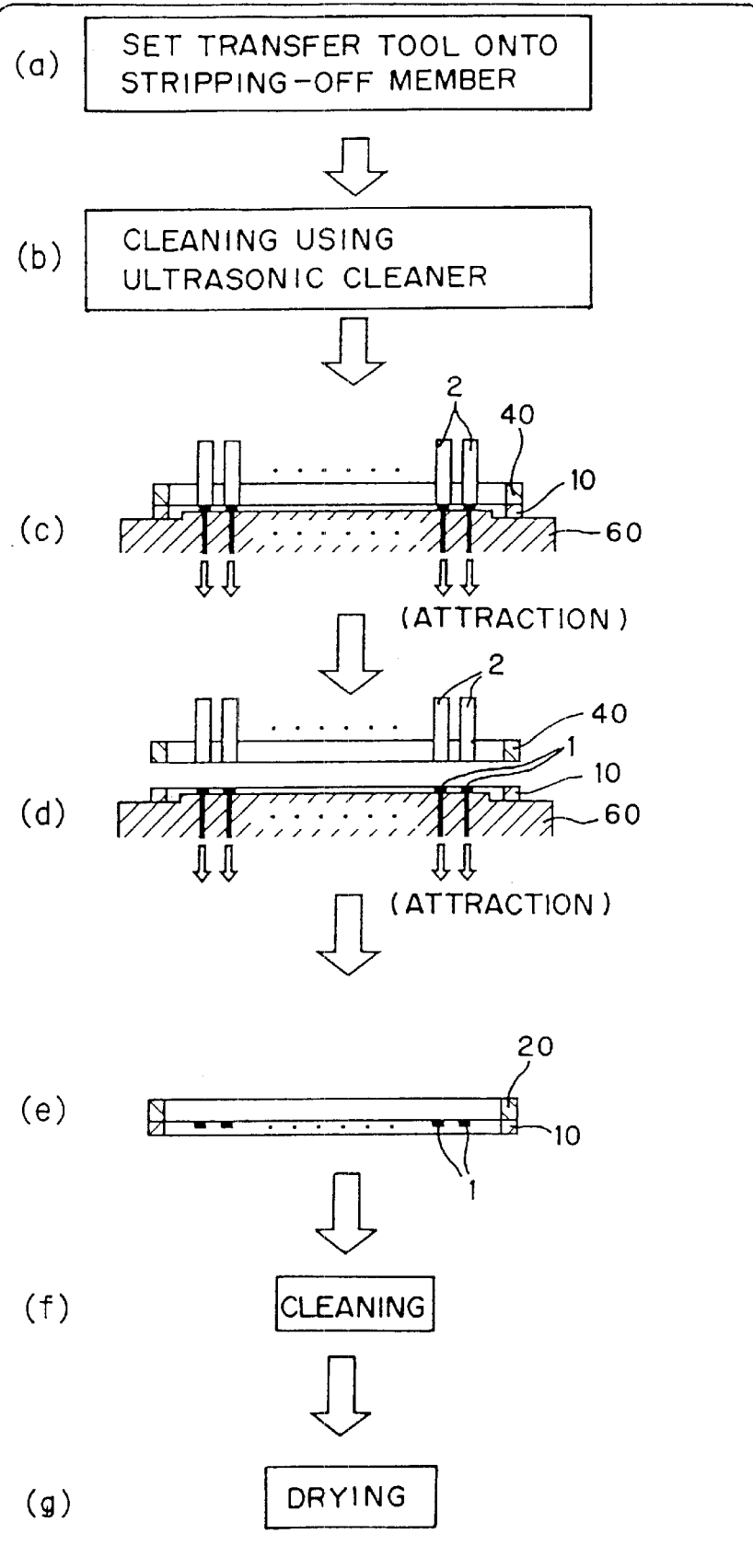

RAW BAR STRIPPING OFF AND CLEANING JIG AND RAW BAR STRIPPING OFF AND CLEANING METHOD

BACKGROUND OF THE INVENTION

1. Field of the Invention

The present invention relates to a raw bar stripping-off and cleaning jig used in a process of stripping off a raw bar, which is in a state that a plurality of magnetic heads or the like in the process of being manufactured are lined up, from a transfer tool to which the raw bar adheres and cleaning the same, and a raw bar stripping off and cleaning method of stripping off the raw bar from the transfer tool and cleaning the same using the raw bar stripping off and cleaning jig.

2. Description of the Related Art

In a manufacturing process of magnetic heads, and particularly in a process before the magnetic heads are cut off into a unit magnetic head, the magnetic heads are dealt with in the form referred to as a raw bar, which is in a state that a plurality of magnetic heads in the process of being manufactured are lined up, having for example, a size of length 40 mm×width 2 mm×thickness 0.3 mm or so.

The raw bar, having such a size as mentioned above, is fragile, and thus when the raw bar is dealt with, the raw bar is glued to a so-called transfer tool having a size easy to handle, and the raw bar is dealt with for each transfer tool in such a state.

In this case, finally, a process of stripping off the raw bar glued to the transfer tool from the transfer tool and cleaning the same is indispensable.

Hitherto, in a process of stripping off the raw bar from the transfer tool, there is adopted a method wherein a transfer tool to which a plurality of raw bars are glued is placed on a hot plate to heat the transfer tool so that a waxing adhesive agent is dissolved, and the raw bars are separated from the transfer tool using a plastic plate. After separation of the raw bars, the raw bars are disposed one by one at a slit plate having a raw bar supporting recess portion using tweezers. In the subsequent cleaning process, the slit plate, in which the raw bars are accommodated, is put into a cleaning cage to perform a cleaning by an automatic cleaning machine. After the cleaning, a setting for the subsequent process is performed with alignment of the raw bars in a direction by tweezers.

The use of tweezers to deal with raw bars as mentioned above applies too much force to a raw bar when the raw bar is picked up with tweezers. This causes chipping of raw bars. A method in which no tweezers are used is disclosed in Japanese Patent Laid Open Gazette Hei. 9-207044. According to the method disclosed therein, there is a possibility that when raw bats are stripped off, an edge of a raw bar is hooked. Further, there is a possibility that a cleaning stain remains on a part of a wire, since raw bars are put on the wire for cleaning. The stain cannot be ignored as the device is miniaturized. Thus, while this method is valued in the point that no tweezers are used, it is not a practical method.

SUMMARY OF THE INVENTION

In view of the foregoing, it is an object of the present invention to provide a raw bar stripping off and cleaning jig which may avoid necessity for the use of tweezers to strip off raw bars from a transfer tool and perform a cleaning of the same, and makes it easy to deal with the raw bars in processes of stripping off and cleaning of raw bars, and a raw bar stripping off and cleaning method using the raw bar stripping off and cleaning jig.

To achieve the above-mentioned objects, the present invention provides a raw bar stripping off and cleaning jig for stripping off and cleaning raw bars from transfer tools to which the raw bars are glued, said raw bar stripping off and cleaning jig comprising:

(1) a base wherein at least one pair of frames, on which a plurality of recess portions for supporting the ends of the raw bars after they are stripped off from the transfer tools are arranged at a predetermined arrangement pitch, are arranged across an aperture exposing a portion between the ends of each of the raw bars.

The raw bar stripping off and cleaning jig according to the present invention, as mentioned above, has the base as defined above. This feature makes it possible to sufficiently clean or wash the portion to be used as a device, because, even if a stain remains after cleaning the raw bars, it is associated with only the ends of the raw bars, which are not used as the device.

In the raw bar stripping off and cleaning jig according to the present invention as mentioned above, it is preferable that the jig further comprises:

(2) a stripping off member wherein at least one pair of frames, on which a plurality of recess portions for supporting lower edge portions of the transfer tools to which raw bars are glued excepting both ends of a lower surface are arranged at the same pitch as said predetermined arrangement pitch, are arranged across an aperture exposing the raw bars adhered to the lower surface of the supported transfer tools, wherein said stripping off member is detachably fixed on said base (1), and the recess portions arranged on the frames constituting said base are formed at positions corresponding to the edges of the raw bars adhered to the lower surface of the transfer tools supported by said stripping off member.

In the raw bar stripping off and cleaning jig according to the present invention, as mentioned above, it is preferable that the jig further comprises:

(3) a stripping off suction member having a suction hole at a position wherein said base is placed in a state that said stripping off member, in which the transfer tools wherein the raw bars are glued to the lower surface are arranged, is placed, the position being opposite to the raw bars adhered to the lower surface of the transfer tools, said stripping off suction member being connected to a predetermined suction apparatus and attracting and separating the raw bars from the transfer tools.

In the raw bar stripping off and cleaning jig according to the present invention, as mentioned above, it is preferable that the jig further comprises:

(4) EL cover member having an aperture for exposing upward the raw bars arranged on said base except both ends thereof, said cover member being detachably fixed on said base wherein the raw bars separated from the transfer tools are arranged.

In the raw bar stripping off and cleaning jig according to the present invention, as mentioned above, it is preferable that said stripping off member (2) is detachably fixed on said base by a screw member having a rotatable operating section.

In the raw bar stripping off and cleaning jig according to the present invention, as mentioned above, it is preferable that said stripping off suction member (3) have a hill portion adapted for entering from a lower portion of said base an aperture of said base for exposing the bottom of the raw bars except both ends thereof, and said suction hole is formed on said hill portion at the same pitch as said predetermined arrangement pitch.

In the raw bar stripping off and cleaning jig according to the present invention, as mentioned above, it is preferable that said cover member (4) be detachably fixed on said base by a one screw member having a rotatable operating section.

In the raw bar stripping off and cleaning jig according to the present invention, as mentioned above, it is preferable that in said cover member (4), at least one pair of frames, on which a plurality of projection portions projecting downward toward one edge of the raw bars placed on said base are arranged at the same pitch as said predetermined arrangement pitch, are arranged across an aperture exposing upward the raw bars on said base except both ends thereof.

To achieve the above-mentioned objects, the present invention provides a raw bar stripping off and cleaning method of stripping off and cleaning raw bars from transfer tools, using a raw bar stripping off and cleaning jig comprising: the above-mentioned base (1), stripping off member (2), stripping off suction member (3) and cover member (4), the raw bar stripping off and cleaning method is as follows:

(a) a raw bar stripping off preparation step in which said stripping off member is fixed on said base, and a plurality of transfer tools, to which a lower surface of the raw bars are glued, are arranged on said stripping off member;

(b) an adhesive agent dissolving step in which of the plurality of transfer tools arranged on said stripping off member fixed on said base, at least lower surfaces of the transfer tools, to which the raw bars are glued, are immersed in a solution, and ultrasounds are applied to the solution so that an adhesive agent, which glues the raw bars to the transfer tools, is dissolved;

(c) a raw bar separation step in which the base, to which a stripping off jig is fixed, is placed on said stripping off suction member to attract the raw bars so that the raw bars are separated from the transfer tools;

(d) a raw bar cleaning preparation step in which said stripping off member is removed from said base in a state that the raw bars are attracted by said stripping off suction member, so that the raw bars are retained on said base, and said cover member is fixed on said base; and (e) a raw bar cleaning step in which the raw bars are washed in a state that the raw bars are sandwiched between said base and said cover member.

The use of the raw bar stripping off and cleaning jig according to the present invention involves no necessity for picking up raw bars with tweezers in any steps constituting the raw bar stripping off and cleaning method according to the present invention. Further, according to the present invention, it is possible to readily deal with a plurality of raw bars at once, and also to transfer the plurality of raw bars to the subsequent step in the state of alignment, and thereby preventing the chipping of raw bars and improving the efficiency in a raw bar stripping off and cleaning operation.

BRIEF DESCRIPTION OF THE DRAWINGS

FIGS. 15(A) and 15(B) are a plan view and a section view of a suction stand constituting a stripping-off suction member, respectively, FIGS. 16(A) and 16(B) are a plan view and a section view of a block member constituting a stripping-off suction member, respectively.

FIG. 17 is a flow diagram useful for understanding a raw bar stripping off and cleaning method according to an embodiment of the present invention.

DETAILED DESCRIPTION OF PREFERRED EMBODIMENTS

Hereinafter, there will be described embodiments of the present invention.

Figure 1:
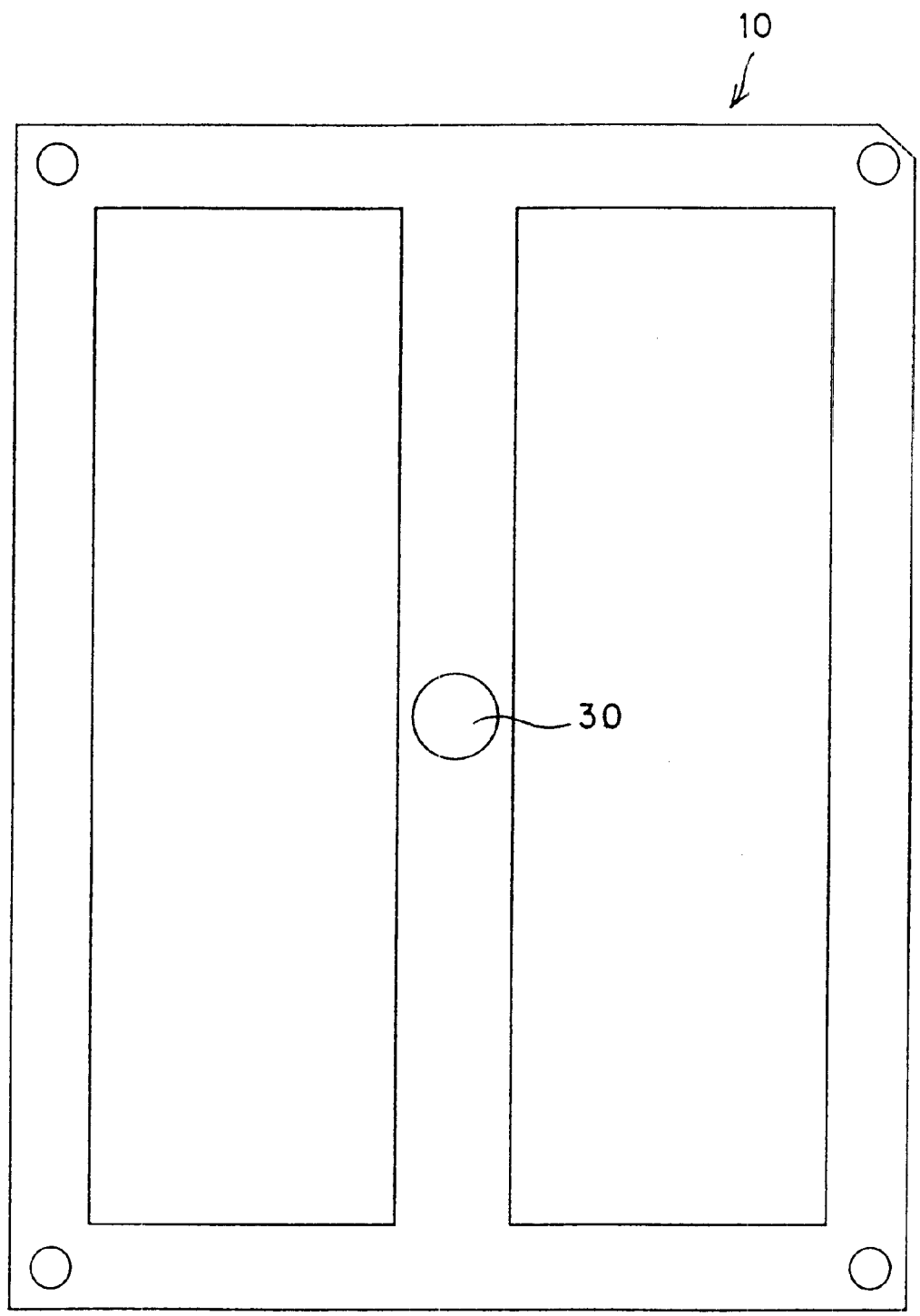
FIG. 1 is a plan view showing a state that a cover member is placed on a base and fixed thereon.
Figure 2:
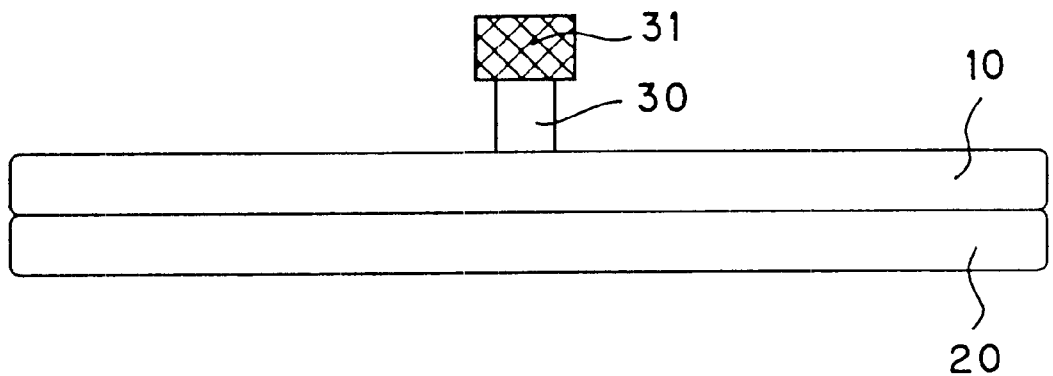
FIG. 2 is a side elevation showing a state that a cover member is placed on a base and fixed thereon.
Figure 3:
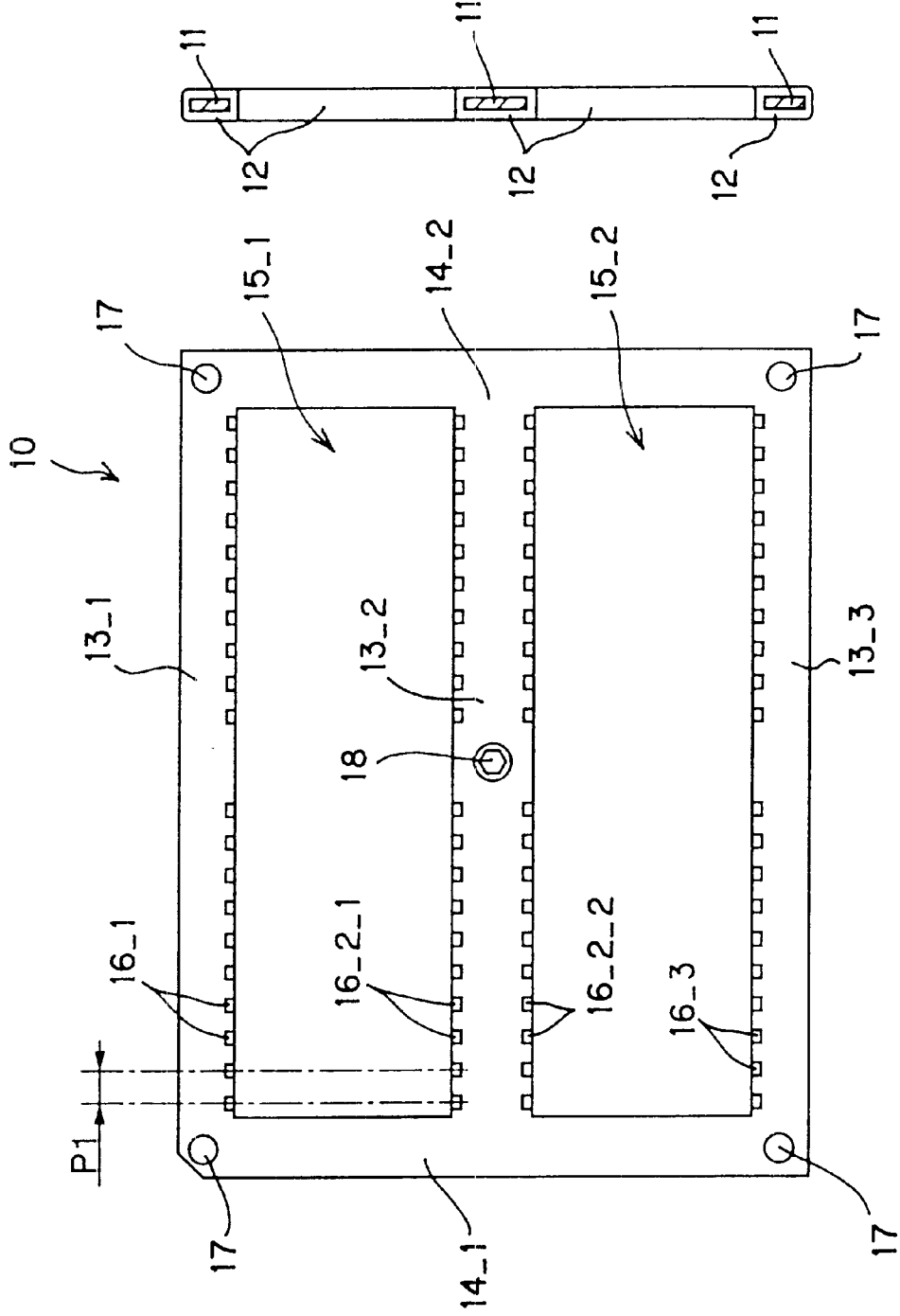
FIGS. 3(A) and 3(B) are a plan view and a section view of a base, respectively.
Figure 4:
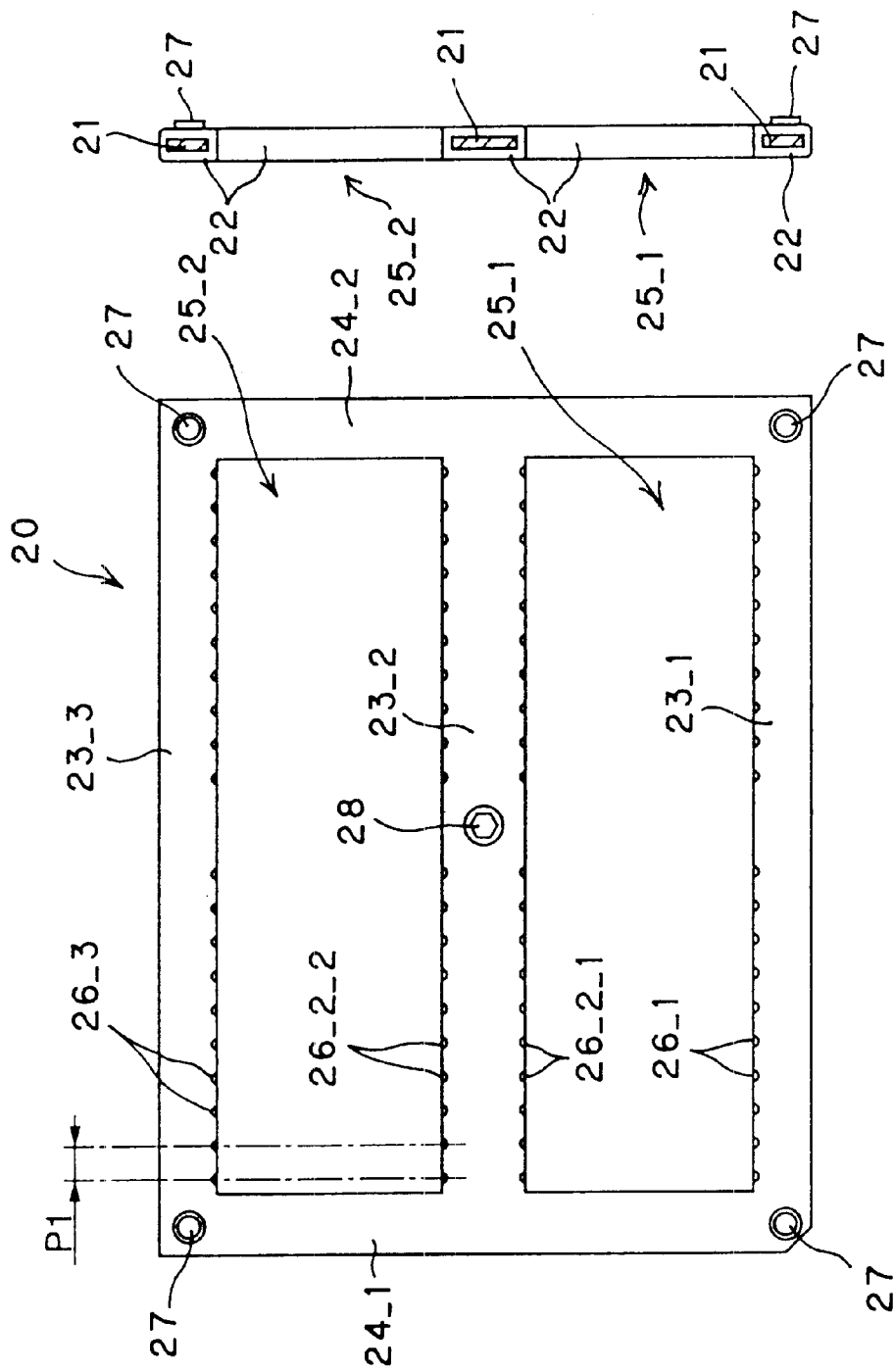
FIGS. 4(A) and 4(B) are a plan view and a section view of a cover member looking from the bottom, respectively.

FIG. 1 is a plan view showing a state that a cover member is placed on a base and fixed thereon. FIG. 2 is a side elevation showing a state that a cover member is placed on a base and fixed thereon. FIGS. 3(A) and 3(B) are a plan view and a section view of a base, respectively. FIGS. 4(A) and 4(B) are a plan view and a section view of a cover member looking from the bottom, respectively.

A cover member 20 is detachably fixed on a base 10 by a screw member 30.

The base 10 has, as shown in FIG. 3(B), a structure that metallic frames 11 are covered by conductive plastics 12 having a property excellent in chemical resistance, and also has, as shown in FIG. 3(A), a configuration that two apertures 15_1, 15_2, which penetrate through the front and the back, are defined by three long frames 13_1, 13_2, 13_3, and two short frames 14_1, 14_2.

On tie long frame 13_1, there are formed recess portions 16_1 each for supporting one end of an associated raw bar, which will be described later, at pitches p1 of an arrangement of raw bars along the aperture 15_1, except for the central portion. On the long frame 13_2, there are formed recess portions 16_2_1 each for supporting another end of an associated raw bar at the same pitches p1 along the aperture 15_1. In a similar fashion to those, on the long frame 13_2, there are formed recess portions 16_2_2 each for supporting one end of an associated raw bar at pitches p1 along the aperture 15_2. On the long frame 13_3, there are formed recess portions 16_3 each for supporting another end of an associated raw bar at pitches p1 along the aperture 15_2.

Raw bars are arranged at pitches p1 in longitudinal direction of the long frames 13_1 and 13_2 in. such a manner that both ends of each of the raw bars are placed on the associated recess portion 16_1 formed on the long frame 13_1 and the associated recess portion 16_2_1 formed on the long frame 13_2, respectively, in the state of bridging the aperture 15_1. In a similar fashion to this, raw bars are arranged at pitches p1 in longitudinal direction of the long frames 1_32 and 1_33 in such a manner that both ends of each of the raw bars are placed on the associated recess portion 16_22 formed on the long frame 1_32 and the associated recess portion 16_3 formed on the long frame 13_3, respectively, in the state of bridging the aperture 15_2.

Figure 5:
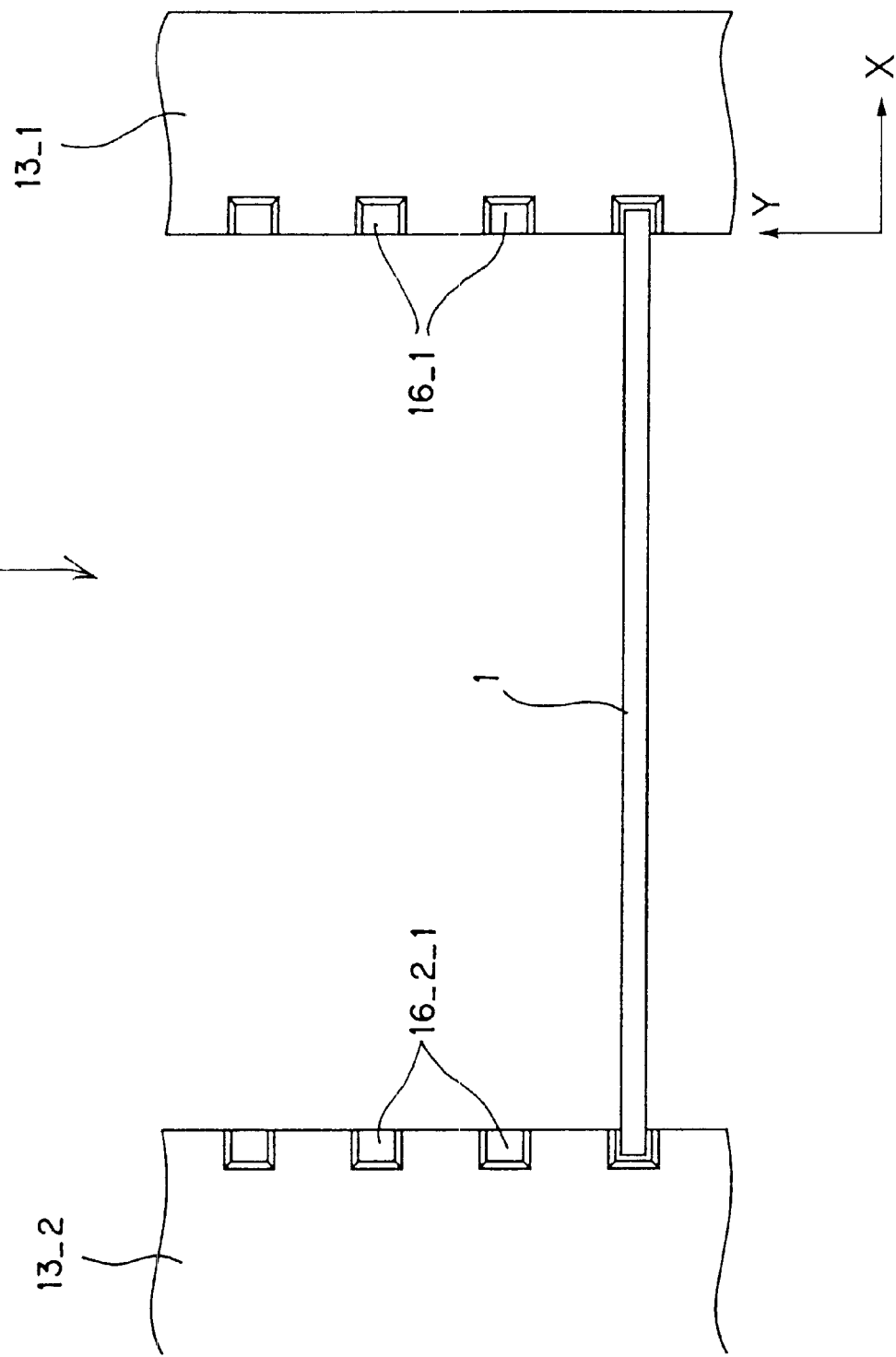
FIG. 5 is an illustration showing a raw bar bridged between long frames of a base.

FIG. 5 is an illustration showing a raw bar 1 bridged between the long frames 13_1 and 13_2 of the base 10.

Both ends of the raw bar 1 are placed on the associated recess portion 16_1 formed on the long frame 13_1 and the associated recess portion 16_2_1 formed on the long frame 13_2, respectively, wherein a position of the raw bar 1 is defined by the recess portions 16_1 and 16_2_1 in connection with an X-direction and a Y-direction as shown in FIG. 5. Almost the whole raw bar 1, except both the ends placed on the recess portions 16_1 and 16_2_1, is exposed to the aperture 15_1. While FIG. 5 shows simply only one raw bar 1, a plurality of raw bars are arranged at pitches p1 in association with the recess portions 16_1 and 16_2_1, arranged at pitches pl. Further, while FIG. 5 shows the raw bar bridged between the long frame 13_1 and the long frame 13_2, likely also a plurality of raw bars are bridged between the long frame 13_2 and the long frame 13_3.

Again referring to FIGS. 3(A) and 3(B) there will be explained the base 10.

On the cross points of the long frames 13_1 and 13_3 and the long frames 14_1 and 14_2, there are formed total four recesses 17. The recesses 17 are engaged with positioning projections 27 (cf. FIG. 4) formed on the cover member 20, respectively, and serve as a positioning recess for performing a positioning between the base 10 and the cover member 20.

Also on positions associated with the positioning 2 recesses 17, of the back of the base 10 there are formed recesses (not illustrated). Those recesses are for performing the positioning between the base and the stripping off suction member (cf. FIGS. 13 and 14) through engagement with positioning projections formed on the upper surface of the stripping off suction member.

Further, on the center of the base 10 shown in FIG. 3(A), there is provided a tapped hole 18 on which a female screw to be engaged with the screw member 30 shown in FIG. 2 is formed.

The cover member 20, similar to the base 10, as shown in FIG. 4(B), has such a structure that metallic frames 21 are covered by conductive plastics 22 having a property excellent in chemical resistance, and also has, as shown in FIG. 4(A), a configuration that two apertures 25_1, 25_2, which penetrate through the front and the back, are defined by three long frames 23_1, 23_2, 23_3, and two short frames 24_1, 24_2.

On the long frame 23_1, there are formed projections 26_1 each projecting in the lower direction (since FIG. 4(A) is a view showing the back, it means a forward direction with respect to the figure) with respect to one end of an associated raw bar, which is loaded on the base, at pitches p1 of an arrangement of raw bars along the aperture 25_1, except for the central portion. On the long frame 23_2, there are formed projections 26_2_1 each projecting in the lower direction with respect to another end of an associated raw bar, at the same pitches p1 along the aperture 25_1. in a similar fashion to those, on the long frame 23_2, there are formed projections 26_2_2 each projecting in the lower direction with respect to one end of an associated raw bar, at pitches p1 along the aperture 25_2. On the long frame 23_3, there are formed projections 26_3 each projecting in the lower direction with respect to another end of an associated raw bar, at pitches p1 along the aperture 25_2.

Further, in the cover member 20, at four corners there are formed the positioning projections 27 projecting downward, and at the center there is provided a tapped hole 28 on which a female screw to be engaged with the screw member 30 as shown in FIG. 2 is formed.

The cover member 20 is placed on the base 10 so that the positioning projections 27 engage with the positioning projections 17 of the base 10, and is fixed on the base 10 by the screw member 30 as shown in FIG. 2. The screw member 30 is provided with an operating member 31 for rotatable handling. A manually turning operation makes it possible to readily fix the cover member 20 on the base 10 or remove the c over member 20 from the base 10.

Figure 6:
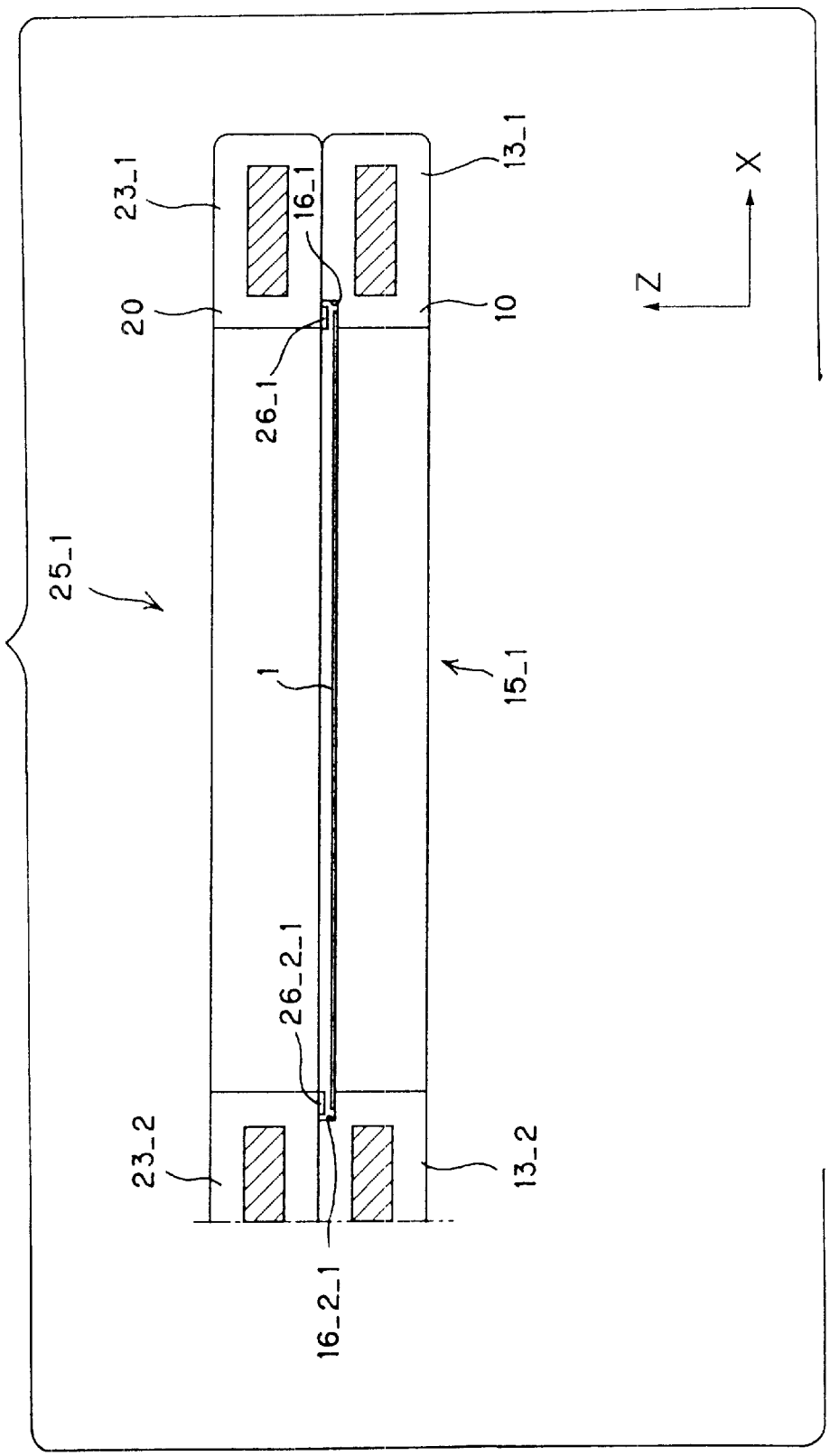
FIG. 6 is a sectional view showing a state that a cover member is fixed on a base.

FIG. 6 is a sectional view showing a state that a cover member is fixed on a base.

As explained referring to FIG. 5, both ends of the raw bar 1 are placed on the associated recess portion 16_1 formed on the long frame 13_1 of the base 10 and the associated recess portion 16_2_1 formed on the long frame 13_2, respectively. Almost the whole raw bar 1 but both the edges placed on the recess portions 16_1 and 16_2_1 is exposed to the aperture 15_1. When the cover member 20 is placed on the base 10 on which the raw bar 1 is disposed, the projection 26_1 formed on the long frame 23_1 of the cover member 20 is located to face against the end of the raw bar 1 supported by the recess portions 16_1 of the base 10. In a similar fashion to this, the projection 26_21 formed on the long frame 23_2 of the cover member 20 is located to face against the end of the raw bar 1 supported by the recess portions. 16_2_1 of the base 10 Thus, the raw bar 1 is defined in position of a Z-direction. A major part of the raw bar 1 except both the ends is exposed to the aperture 25_1 of the cover member 20 in the upper surface. In this manner, the raw bar 1 sandwiched between the base 10 and the cover member 20 is retained in the sandwiched state while it is associated with closeness somewhat in X, Y, Z-directions shown in FIGS. 5 and 6.

While the above explanation has been made in connection with the raw bar disposed between the long frames 13_1 and 23_1 and the long frames 13_2 and 23_2, this is completely the same also in connection with the raw bar disposed between the long frames 13_2 and 23_2 and the long frames 13_3 and 23_3.

Figure 7:
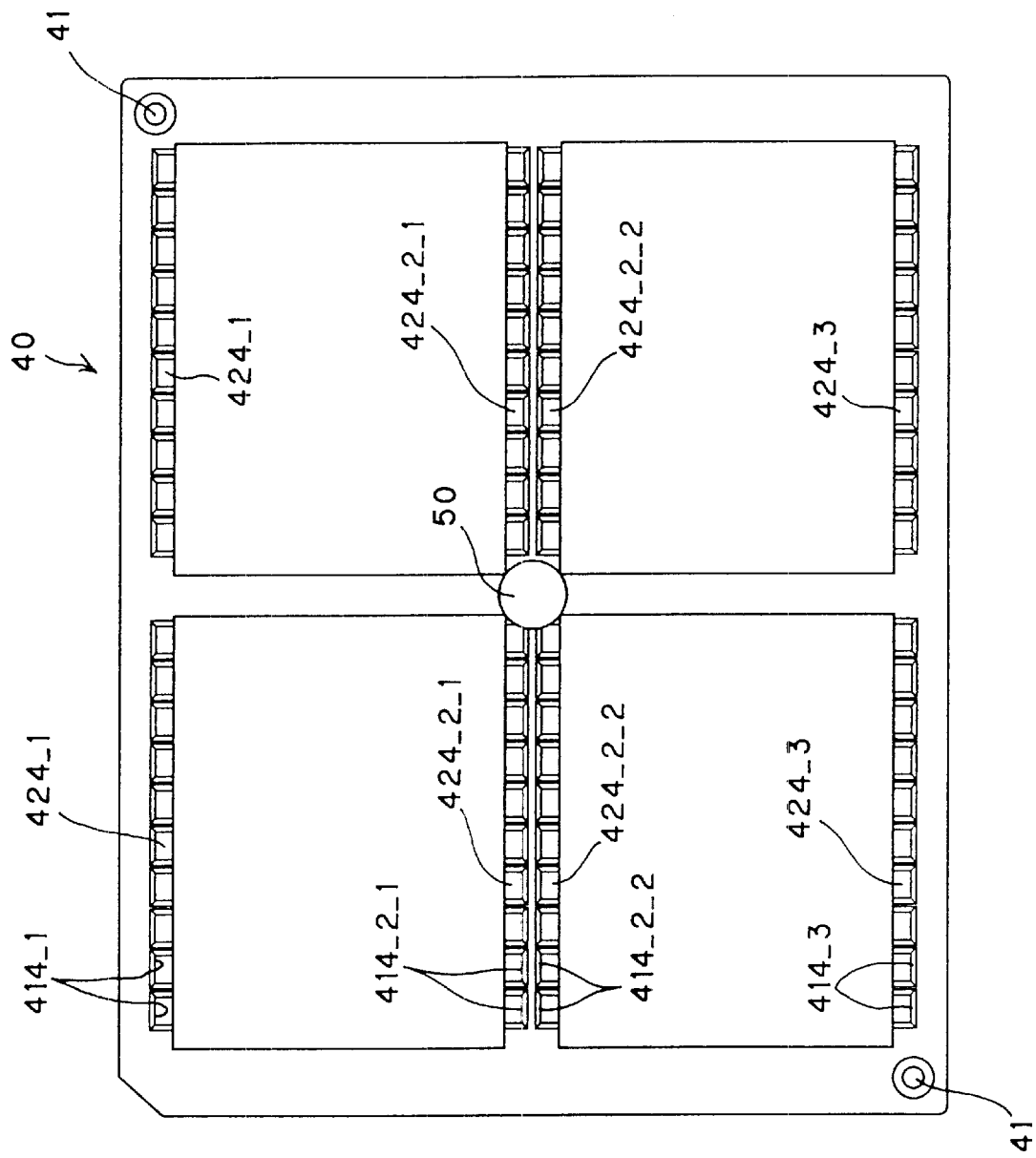
FIG. 7 is a plan view showing a state that a stripping-off member is placed on a base and fixed thereon.
Figure 8:
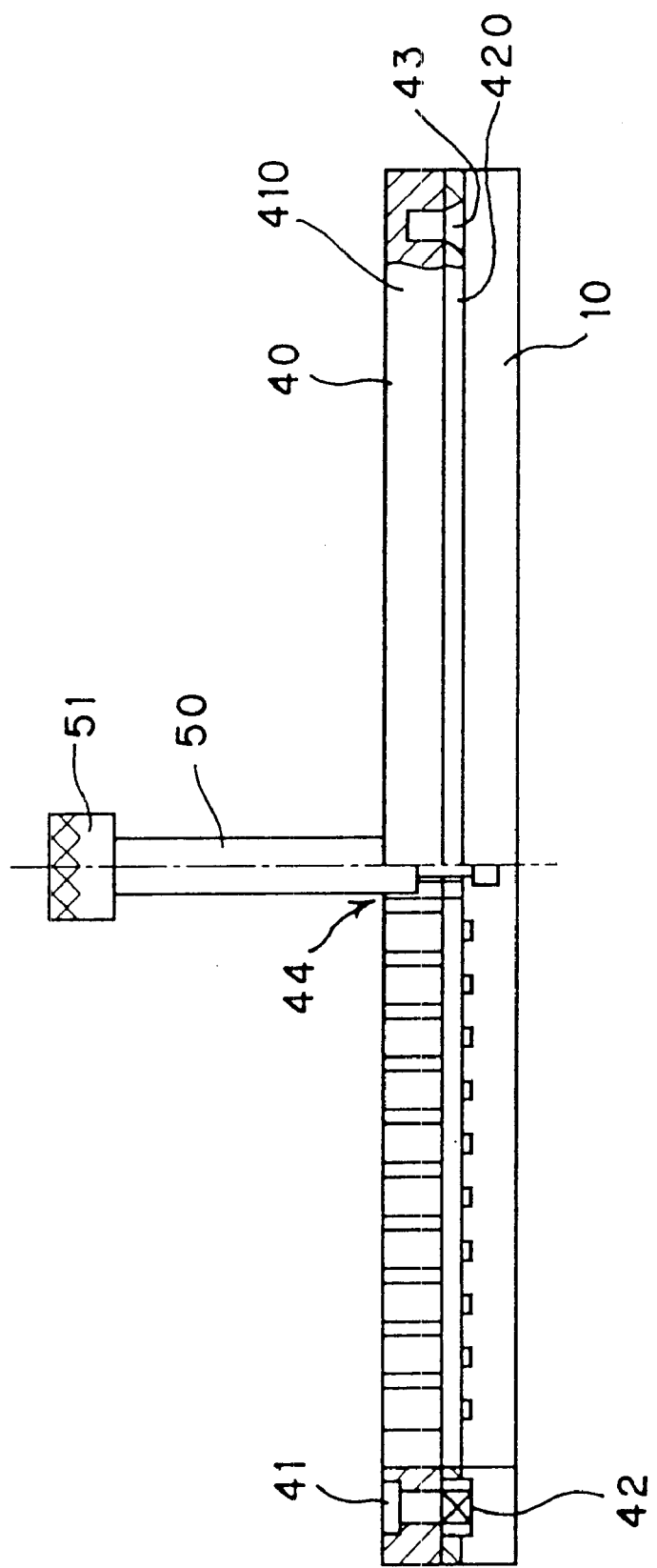
FIG. 8 is a side elevation view showing a state that a stripping-off member is placed on a base and fixed thereon, partially with a sectional view.
Figure 9:
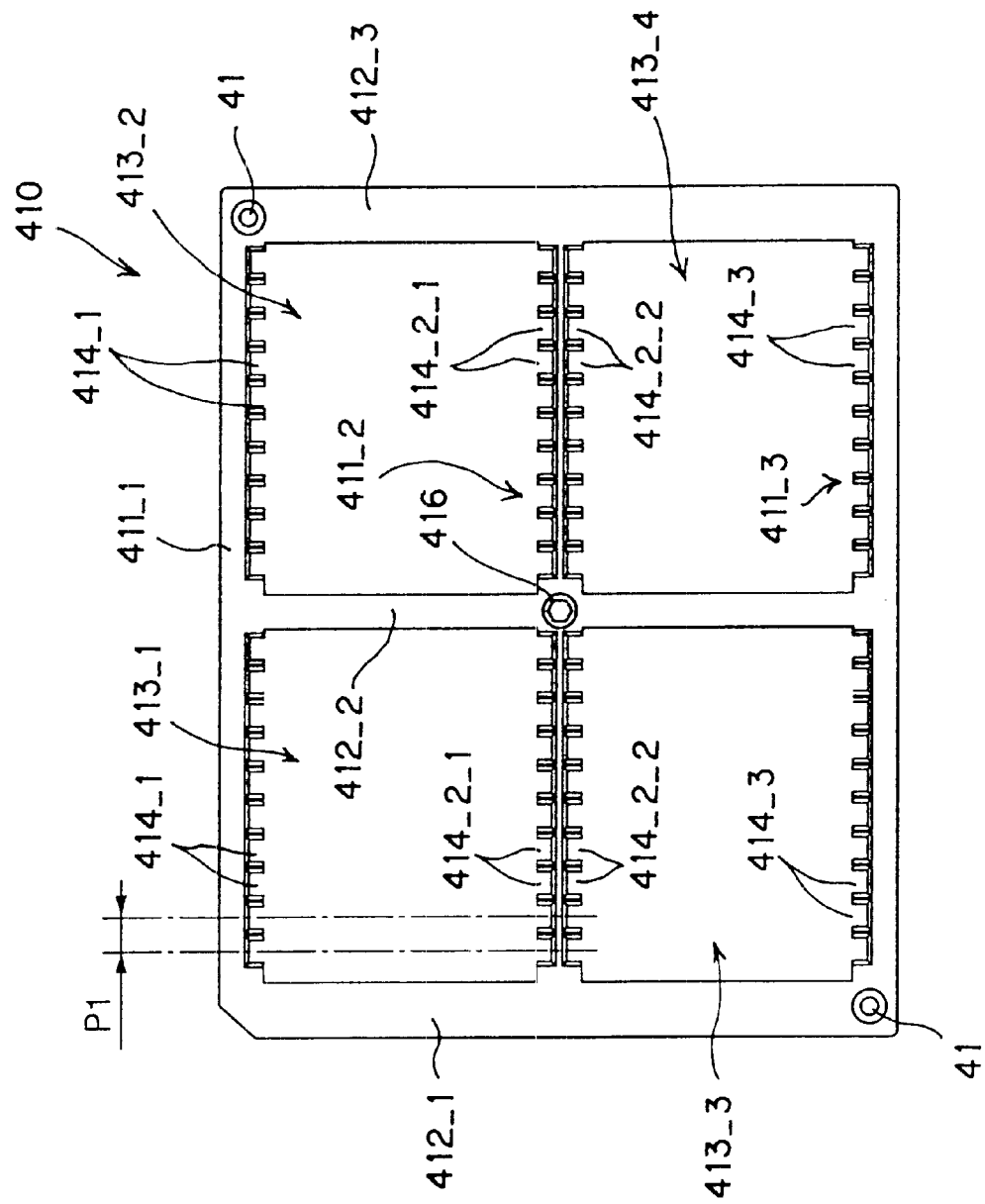
FIG. 9 is a plan view of an upper member constituting a stripping-off member.
Figure 10:
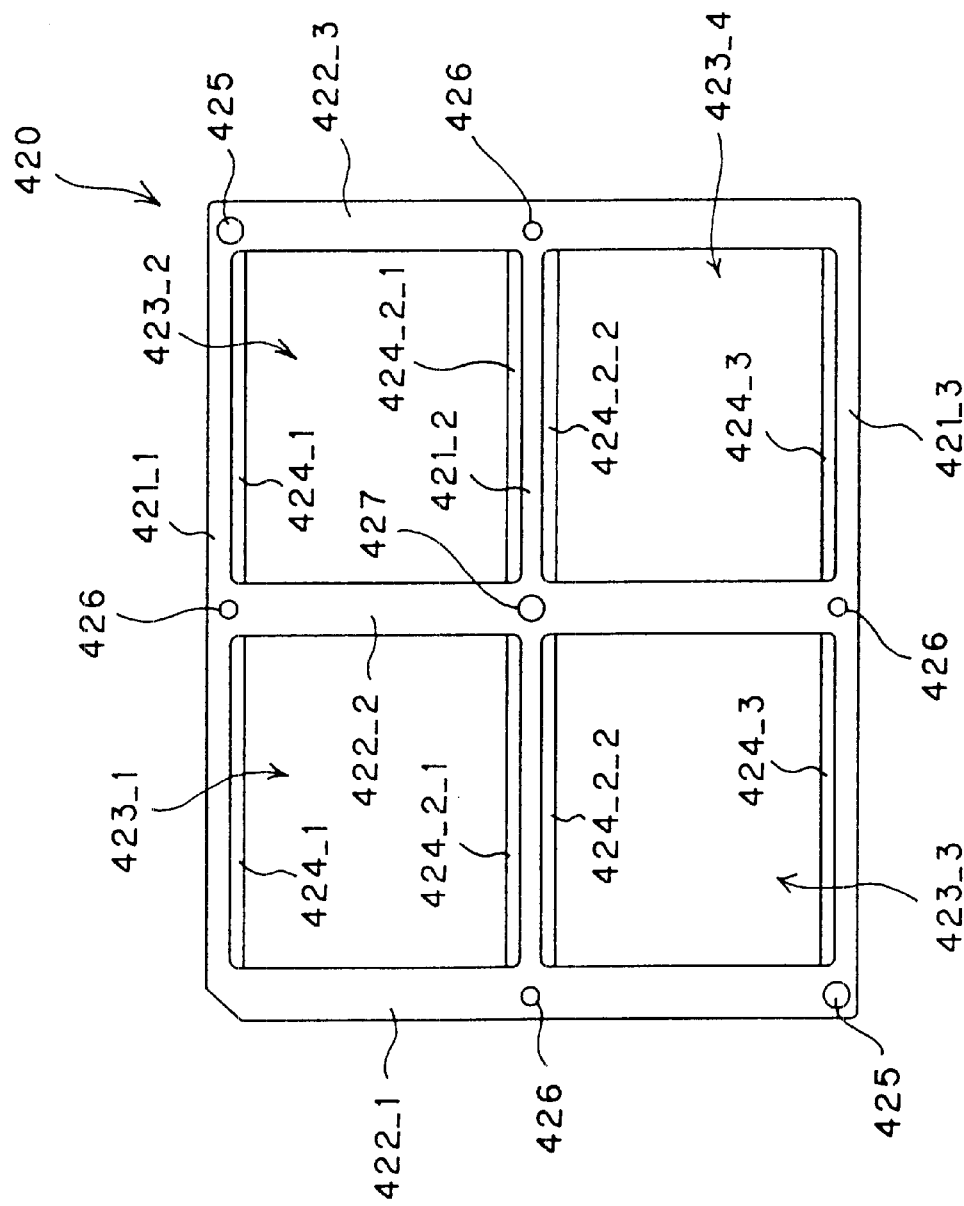
FIG. 10 is a plan view of a lower member constituting a stripping-off member.

FIG. 7 is a plan view showing a state that a stripping-off member is placed on a base and fixed thereon. FIG. 8 is a side elevation showing a state that a stripping-off member is placed on a base and fixed thereon, partially with a sectional view. FIG. 9 is a plan view of an upper member constituting a stripping-off member. FIG. 10 is a plan view of a lower member constituting a stripping-off member.

On the base 10, there is disposed a stripping-off member 40 instead of the cover member 20 shown in FIGS. 1 and 2. The stripping-off member 40 is detachably fixed on the base 10 by a screw member 50.

The stripping-off member 40 comprises, as shown in FIG. 8, a pair of an upper member 410 and a lower member 420.

The upper member 410 and the lower member 420 are fixed together by a countersunk screw 43 from the bottom side of the lower member 420.

On the stripping-off member 40, there is formed an engagement portion comprising a recess 41 forming the upper side and a projection 42 forming a lower side. The projection 42 of the lower side of the engagement portion is engaged with the associated positioning recess 17. Thus, the stripping-off member 40 is positioned on the base 10.

On the center of the stripping-off member 40, there is formed a tapped hole 44 into which the screw member 50 enters on a screw basis. The stripping-off member 40 is placed on the base 10 in a positioned state, and is fixed on the base 10 by the screw member 50. The screw member 50 is provided with an operating member 51 for, rotatable handling. A manually turning operation of the operating member 51 makes it possible to readily fix the stripping-off member 40 on the base 10 or remove the stripping-off member 40 from the base 10. At least a portion of the screw member 50, which is engaged with the tapped hole 18 (cf. FIG. 3) of the base 10, is the same configuration as the portion corresponding to the screw member 30 shown in FIG. 2.

The upper member 410 constituting the stripping-off member 40 has, as shown in FIG. 9, a configuration that four apertures 413_1, 413_2, 413_3, 413_4, which penetrate through the front and the back, are defined by three long frames 411_1, 411_2, 411_3, and three short frames 412_1, 412_2, 412_3.

On the long frame 411_1, there are formed position defining members 414_1 each for defining a position of one edge of an associated transfer tool, which will be described later, as to the lateral direction on FIG. 9 at pitches p1 along the apertures 413_1, 413_2. On the long frame 411_2, there are formed position defining members 414_2_1 each for defining a position of another edge of an associated transfer tool as to the lateral direction on FIG. 9 at pitches p1 along the apertures 413_1, 413_2. In a similar fashion to those, on the long frame 411_2, there are formed position defining members 414_2_2 each for defining a position of one edge of an associated transfer tool as to the lateral direction on FIG. 9 at pitches p1 along the apertures 413_3, 413_4. On the long frame 411_3, there are formed position defining members 414_3 each for defining a position of another edge of an associated transfer tool as to the lateral direction on FIG. 9 at pitches p1 along the apertures 413_3, 413_4.

On the right upper corner and the left lower corner of the upper member 410 shown in FIG. 9, there are formed a total of two recesses 41 which are also shown in FIG. 8. On the center of the upper member 410, there is provided a tapped hole 416 to be engaged with the screw member 50 shown in FIG. 8.

Further, the lower member 420 constituting the stripping-off member 40 has, as shown in FIG. 10, a configuration that four apertures 423_1, 423_2, 423_3, 423_4, which penetrate through the front and the back, are defined by three long frames 421_1, 421_2, 421_3, and three short frames 422_1, 422_2, 422_3.

On the long frame 421_1, there are formed placing stands 424_1 each for placing one edge of an associated transfer tool along the apertures 423_1, 423_2. On the long frame 421_2, there are formed placing stands 424_2_1 each for placing another edge of an associated transfer tool along the apertures 423_1, 423_2.

In a similar fashion to the above, on the long frame 421_2, there are formed placing stands 424_2_2 each for placing one edge of an associated transfer tool along the apertures 423_3, 423_4. On the long frame 421_3, there are formed placing stands 424_3 each for placing another edge of an associated transfer tool along the apertures 423_3, 423_4.

On the right upper corner and the left lower corner of the lower member 420 shown in FIG. 10, there are formed total two through-holes 425 trough which projections 42 (cf. FIG. 8) project downward from the upper member 410. On the respective centers of the lower member 420 with respect to right and left and high and low, there are provided via-holes 426 into which, the countersunk screws 43 (FIG. 8 shows only one countersunk screw 43) are pushed form the bottom side. On the center of the lower member 420, there is provided a through-hole 427 into which the screw member 50 (cf. FIG. 8) is inserted.

The upper member 410 and the lower member 420, which are shown in FIGS. 9 and 10, respectively, are superposed together as shown in FIGS. 7 and 8, and fixed together by four countersunk screws 43. When the upper member 410 and the lower member 420 are superposed together, as shown in FIG. 7, the placing stands 424_1, 424_2_1, 424_2, 424_3 of the lower member 420 are disposed just below the position defining members 414_1, 414_2_1, 414_2_2, 414_3 formed on the upper member 410.

Figure 11:
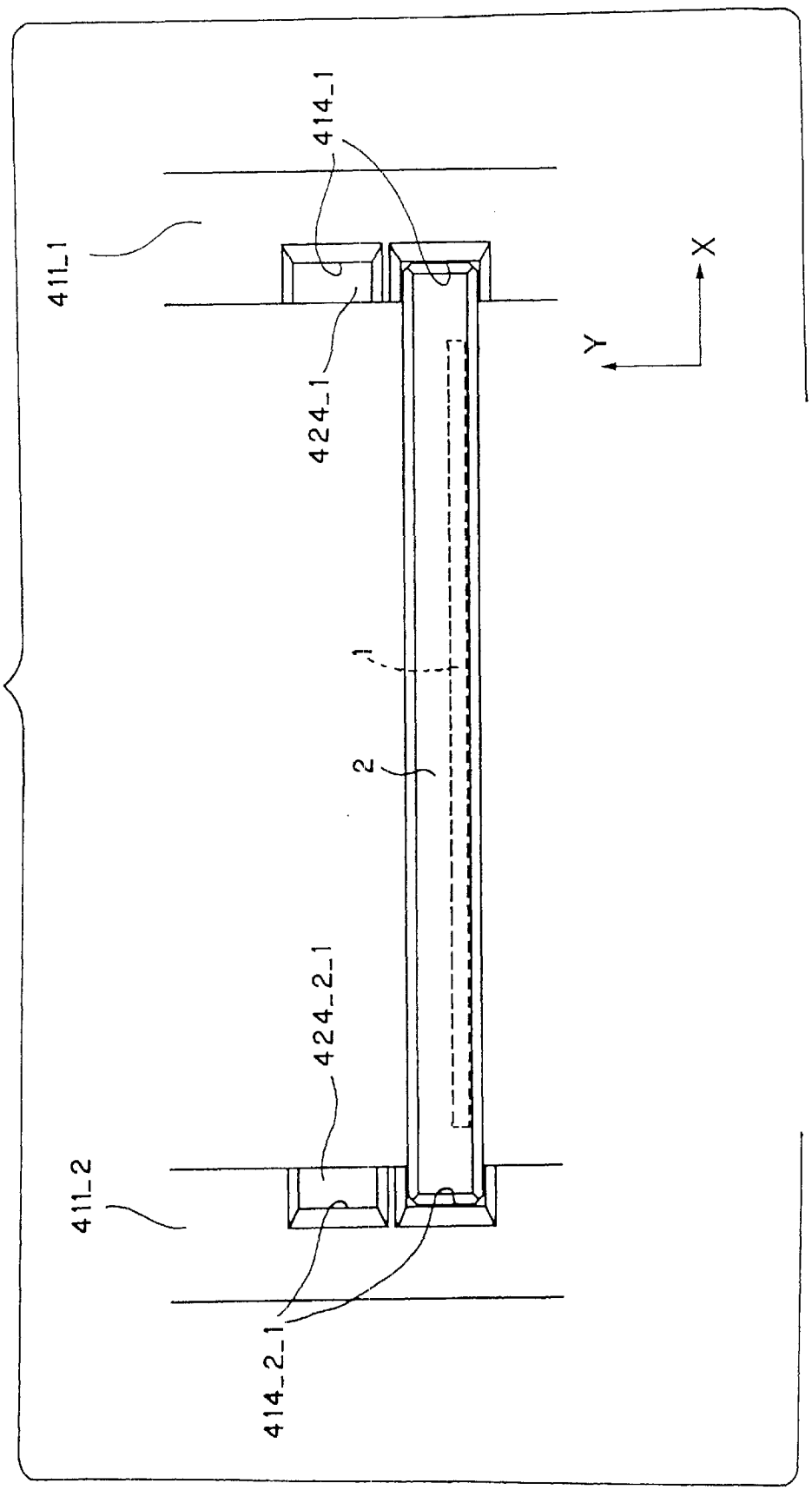
FIG. 11 is a typical illustration showing a state that a transfer tool is placed on a stripping-off member.

FIG. 11 is a typical illustration showing a state that a transfer tool is placed on a stripping-off member.

A raw bar 1 is glued onto a portion but both ends on the lower surface of a transfer tool 2. The transfer tool 2, wherein the raw bar 1 is glued onto the lower surface, is placed in such a manner that both the edges of the transfer tool 2 are engaged with the position defining members 414_1 and 414_2_1, which are formed on the long frames 411_1 and 411_2, respectively. Under the position defining members 414_1 and 414_2_1, there are located placing stands 424_1 and 424_2_1 formed on the lower member 420 providing the stripping-off member 40, respectively. The edges of the transfer tool 2 are placed on the placing stands 424_1 and 424_2_1, respectively. Thus, the transfer tool 2 is placed on the stripping-off member in a state that the transfer tool 2 is defined in position as to an X-direction and a Y-direction shown in FIG. 11 by the position defining members 414_1 and 414_21, and in position as to a height direction (Z-direction: cf FIG. 12) by the placing stands 424_1 and 424_2_1. The raw bar 1 glued onto the lower surface of the transfer tool 2 is exposed in its entirety from the aperture to the lower. While FIG. 11 shows simply only one raw bar 1, a plurality of raw bars are arranged in an arrangement direction of the position defining members 414_1 and 414_2_1. Further while FIG. 1 shows the transfer tool 2 bridged between the position defining members 414_1 and 414_2_1 which are formed on the long frame 411_1 and the long frame 411_2, this is the same also in connection with a relation between the transfer tool and the position defining members 414_2_2 and 414_3 which are formed on the long frame 4112 and the long frame 411_3.

Figure 12:
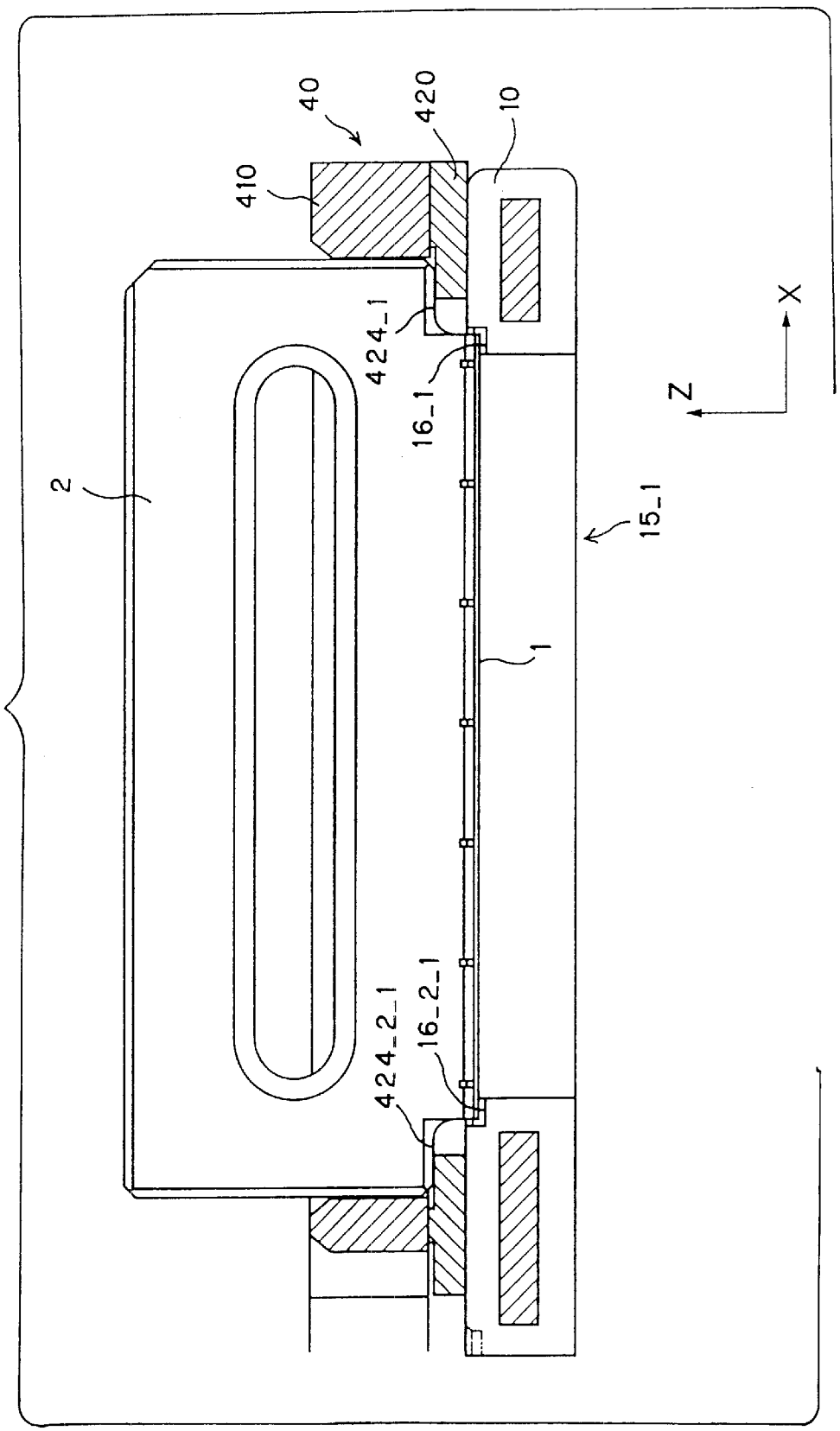
FIG. 12 is a sectional view showing a state that a stripping-off member, on which a transfer tool is placed, is placed on a base.

FIG. 12 is a sectional view showing a state that the stripping-off member 40, on which the transfer tool 2 is placed, is placed on the base 10.

Both the edges of the transfer tool 2 are placed on the placing stands 424_1 and 424_2_1 formed on the lower member 420 of the stripping-off member 40. At that time, both the ends of the raw bar 1 adhered to the lower surface of the transfer tool 2 are disposed at positions associated with recesses 16_1 and 16_2_1 formed on the base 10.

Figure 13:
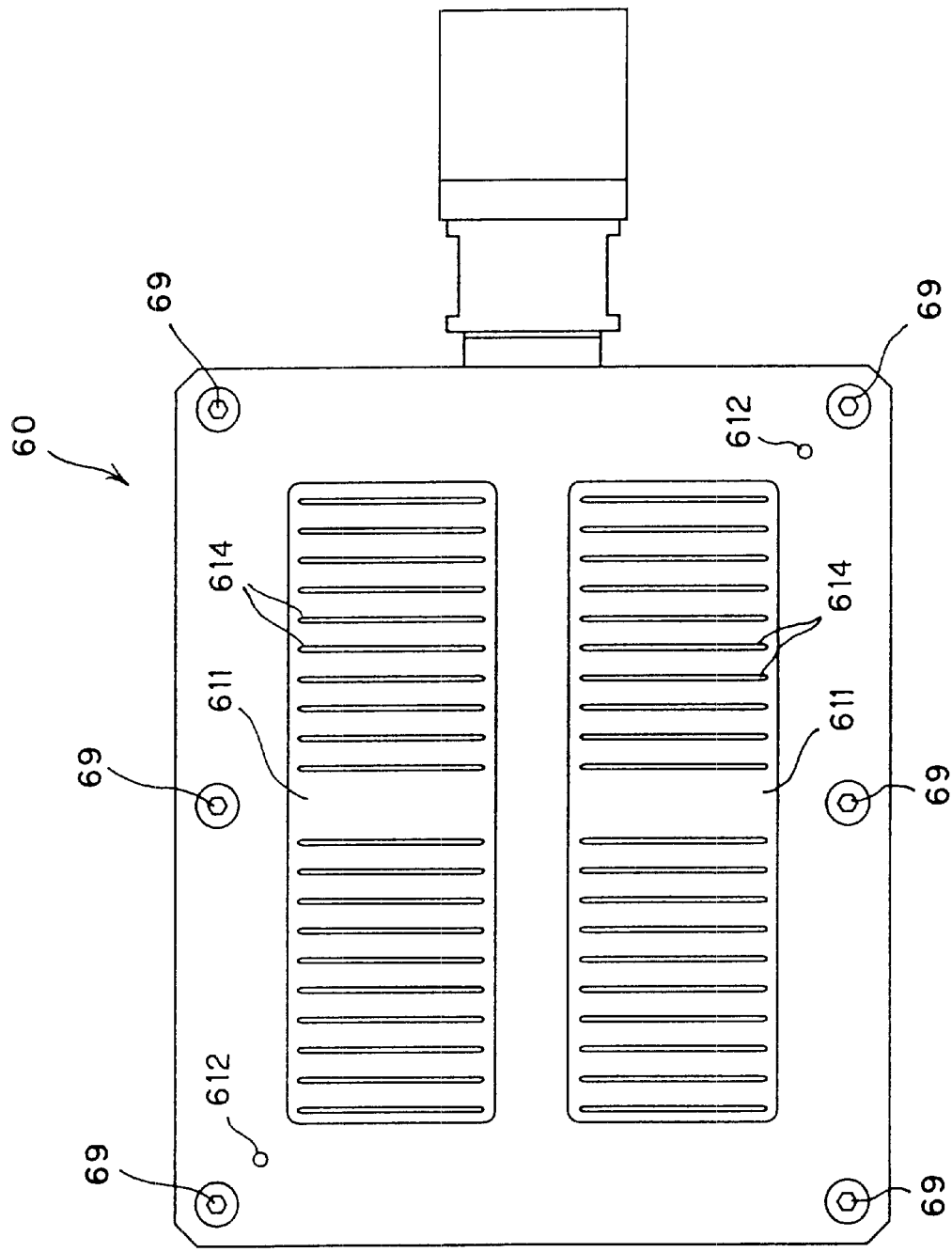
FIG. 13 is a plan view of a stripping-off suction member in the present embodiment.
Figure 14:
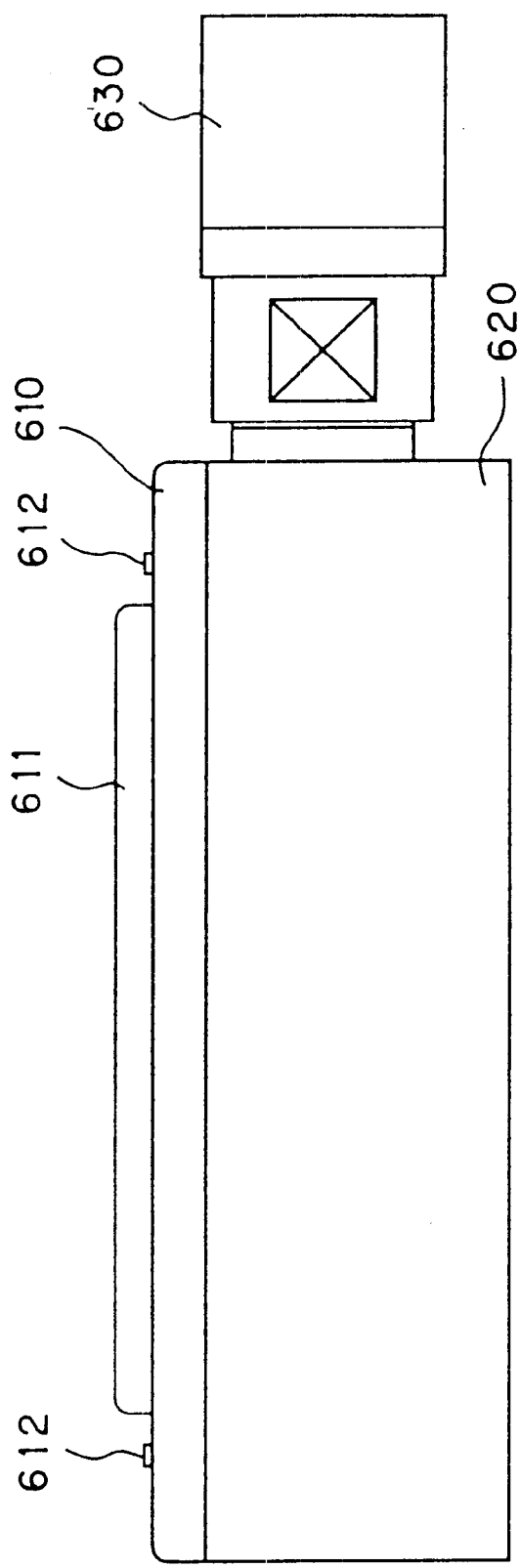
FIG. 14 is a front view of a stripping-off suction member in the present embodiment.

FIG. 13 is a plan view of a stripping-off suction member in the present embodiment. FIG. 14 is a front view of a stripping-off suction member in the present embodiment. FIGS. 15(A) and 15(B) are a plan view and a section view of a suction stand constituting a stripping-off suction member, respectively. FIGS. 16(A) and 16(B) are a plan view and a section view of a block member constituting a stripping-off suction member, respectively.

A stripping-off suction member 60 comprises a rectangular suction stand 610, a block member 620 on which the suction stand 610 is fixed by a screw 69, and a box type of joint 630. The suction stand 610 is a board-like shaped member of conductive plastics having a property excellent in chemical resistance.

The suction stand 610 has two hill portions 611 which are located in a parallel relation, and in addition the associated two projections 612 located apart from the hill portions 611. The projections 612 serve as a positioning projection through an engagement with the recesses formed at the positions associated with the recesses 17 shown in FIG. 3, on the lower surface of the base 10 (cf. FIG. 3). The two hill portions 611 have such a size that when the base 10 is placed on the stripping-off suction member 60, the hill portions 611 may enter the aperture 15_1 and 15_2 (cf. FIG. 3) of the base 10. The height of hill portions 611_1 and 611_2 is given with such a height that the upper surface of the hill portion is adjacent to the raw bar 1 adhered to the lower surface of the transfer tool 2 disposed as shown in FIG. 12. Further, in the hill portions 611, there are formed cavities 613 as shown in FIG. 15(B), and long holes 614 for a raw bar suction leading to the associated cavities 613 are formed at the positions opposite to the raw bars disposed as shown in FIG. 12 in a relation of a one-to-one association between the raw bars and the long holes 614. The long holes 614 are smaller slightly in size than the raw bar 1 in such an extent that the long hole 614 is covered by the raw bar 1.

The box type of block member 620 has a recess portion 621, as shown in FIG. 16, which is formed by hollowing out the block member 620. On the periphery of the block member 620, there are tapped holes 622. The suction stand 610 shown in FIG. 15 is placed on the block member 620 and fixed by the screws 69 through the tapped holes 622.

On the one end of the block member 620, there is formed a side hole 623 leading to the recess portion 621 to which the box type of joint 630 (cf. FIG. 14) is connected.

The joint 630 is coupled to a suction apparatus (not illustrated) so that an internal air of the block member 620 is drawn through the joint 630. As a result, air is absorbed from the long holes 614 formed on the hill portions 611 of the suction stand 610, so that the raw bars 1 located at the positions just above the long holes 614 are attracted to the long holes 614. The attractive force can be controlled by means of inserting a spacer between the base 10 and the stripping-off suction member 60.

Next, there will be explained an embodiment of a raw bar stripping off and cleaning method according to the present invention using the raw bar stripping off and cleaning jig comprising the base 10, the cover member 20, the stripping-off member 40 and the stripping-off suction member 60 as mentioned above.

FIG. 17 is a flow diagram useful for understanding a raw bar stripping off and cleaning method according to an embodiment of the present invention.

In step (a), first, as shown in FIG. 8, the stripping-off member 40 is mounted on the base 10 by the screw 50, and a plurality of transfer tools 2, the lower surfaces of which raw bars 1 are glued to, are set up to the stripping-off member 40 (cf. FIGS. 11 and 12).

In step (b), the transfer-tools 2 thus set are immersed in a solution (e.g. ethanol, IPA, etc.) filled in a tank of an ultrasonic cleaner, and ultrasounds are applied for about 15 minutes. Then, a waxing compound of adhesive agent, which is used for gluing the raw bars 1 to the transfer tools 2, is dissolved. Here, since each of the raw bars 1 have a sufficiently wide space around except for the both edges, the adhesive agent is well dissolved.

In step (c), the base 10, on which the stripping-off member 40 is mounted, is taken out from the ultrasonic cleaner, and is placed on the stripping-off suction member 60 so as to perform a suction for the raw bars by the suction apparatus. When the base 10 is taken out from the ultrasonic cleaner, the raw bars 1 are kept on adhesion to the lower surface of the transfer tools 2 by the influence of the surface tension of the solvent. But, when the raw bars 1 are absorbed by the suction apparatus, the raw bars 1 are separated from the transfer tools 2.

In step (d), at the step wherein the suction by the suction apparatus is continued, the screw member 50 (cf. FIG. 8), by which the stripping-off member 40 is fixed on the base 10, is loosened to separate the stripping-off member 40 from the base 10.

In step (e), next, the cover member 20 is placed on the base 10 and is fixed together by the screw member 30' (cf. FIG. 2), and the suction is terminated. And then the base 10, which is placed on the stripping-off member 40, is lifted and separated from the stripping-off suction member 60.

Thus, the exfoliation process for the raw bars is terminated. As would be understood from the above explanation, the raw bars, which are glued to the arranged transfer tools, are stripped off individually and supported in alignment on a batch basis. In this respect, there is no need to deal with the raw bars one by one with tweezers and the like. This feature makes it possible to prevent the chipping and also to greatly effectively perform the exfoliation and accommodation for the raw bars as compared with the conventional scheme. Further, according to the present embodiment, the raw bars are attracted after the use of the ultrasonic cleaner. This attraction of the raw bars causes the raw bars to dry in some extent. Thus, it is possible to enter the successive cleaning process without establishing an especial drying process.

In stop (f), in the subsequent cleaning process, the raw bars sandwiched between the base 10 and the cover member 20 are thrown into an automatic cleaner and subjected to a cleaning about 30 minutes. Here, the raw bars are supported in a state that they are separated one by one and supported by only both the ends of each raw bar. Accordingly, the waxing adhesive agent adhered to the raw bars is well removed by this cleaning.

In step (g), after the cleaning, the raw bars are picked up from the automatic cleaner, and the raw bars sandwiched between the base 10 and the cover member 20 are dried by means of blowing off the redundant solvent by a drying nozzle and the like. Also at that time, the raw bars are supported in a state that they are separated one by one and supported by only both ends of each raw bar. Accordingly, it is possible to dry the raw bars promptly.

In the process subsequent to the drying process, the raw bars are supported in a state that they are already aligned individually one by one. Thus, there is no need to rearrange the raw bars with the tweezers.

Incidentally, according to the embodiments mentioned above, the explanation is made taking into account the raw bars in the process of manufacturing the magnetic heads. However, the present invention is not restricted to dealing with the raw bars for the magnetic heads, and is generally applicable to dealing with the strip-like shaped raw bars similar to the raw bars for the magnetic heads.

As mentioned above, according to the present invention, it is possible to move a plurality of raw bars in a manufacturing process for magnetic heads on a batch basis, and omit troublesomeness alignment of the raw bars, and thereby improving the manufacturing efficiency of the magnetic heads. Further, according to the present invention, there is less danger of chipping of raw bars, and since only both the ends of a raw bar are supported, a solution may sufficiently dissolve an adhesive agent in the stripping-off process and the cleaning process, and thereby improving the cleaning efficiency for the raw bas. Thus, it is possible to improve a quality of products.

Further, according to the present invention, it is possible to avoid the necessity for handling raw bats by tweezers or the like in the exfoliation process for the raw bars, and there is less danger of chipping of raw bars. Thus, it is possible to improve a quality of products. Further, according to the present invention, it is possible to strip off and separate the raw bars from the transfer tool on a batch basis, and there is no need to rearrange the raw bars. Furthermore. according to the present invention, the fixing and separation of the base and the stripping-off member are performed by a single screw member. This feature makes it possible to reduce the operating time.

In this manner, according to the present invention, it is possible to more effectively perform the manufacturing for magnetic heads as compared with the conventional technology, and also to improve a quality of products.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A raw bar stripping off and cleaning jig for stripping off and cleaning raw bars having two ends from transfer tools to which the raw bars are glued, said raw bar stripping off and cleaning jig comprising:

a base wherein at least one pair of frames, on which a plurality of recess portions for supporting the ends of the raw bars are arranged at a predetermined arrangement pitch, are arranged across an aperture exposing a portion except both ends of each of the raw bars, and a stripping off member wherein at least one pair of frames, on which a plurality of recess portions for supporting lower edge portions of the transfer tools to which raw bars are glued are arranged at the same pitch as said predetermined arrangement pitch, are arranged across the aperture, wherein said stripping off member is detachably fixed on said base, and the recess portions arranged on the frames constituting said base are formed at positions corresponding to the ends of the raw bars adhered to the lower surface of the transfer tools supported by said stripping off member.

2. A raw bar stripping off and cleaning jig according to claim 1, further comprising a stripping off suction member having a suction hole, the stripping off suction member being placed at the raw bars opposite to the transfer tools, said stripping off suction member being connected to a predetermined suction apparatus and attracting and separating the raw bars from the transfer tools.

3. A raw bar stripping off and cleaning jig according to claim 2, wherein said stripping off suction member has a hill portion adapted for entering from a lower portion of said base, an aperture of said base exposes the raw bars except the ends thereof, and said suction hole is formed on said bill portion at the same pitch as said predetermined arrangement pitch.

4. A raw bar stripping off and cleaning jig according to claim 1, further comprising a cover member having an aperture for exposing the raw bars arranged on said base except both the ends thereof, said cover member being detachably fixed on said base wherein the raw bars separated from the transfer tools are arranged.

5. A raw bar stripping off and cleaning jig according to claim 4, wherein said cover member is detachably fixed on said base by a screw member having a rotatable operating section.

6. A raw bar stripping off and cleaning jig according to claim 4, wherein in said. cover member, at least one pair of frames, on which a plurality of projection portions projecting downward toward the ends of the raw bars placed on said base are arranged at the same pitch as said predetermined arrangement pitch.

7. A raw bar stripping off and cleaning jig according to claim 1, wherein said stripping off member is detachably fixed on said base by a screw member having a rotatable operating section.

* * * * *